(12) United States Patent
Ferrari et al.

(10) Patent No.: US 6,474,055 B1
(45) Date of Patent: Nov. 5, 2002

(54) TREE SHAKING METHOD

(76) Inventors: Thomas E. Ferrari, 3901 Foxwood St., Bakersfield, CA (US) 93309; Don Evans, 1405 Huntington Cir., Reno, NV (US) 89509

(*) Notice: Subject to any disclaimer, the term of this patent is extended or adjusted under 35 U.S.C. 154(b) by 0 days.

(21) Appl. No.: 09/712,406

(22) Filed: Nov. 13, 2000

(51) Int. Cl.[7] .......................... A01D 46/00; A01D 46/26
(52) U.S. Cl. ...................... 56/340.1; 56/328.1
(58) Field of Search ........................ 248/216.1, 217.4, 248/54.6, 54.7, 219.3, 231.91, 74.5; 56/340.1, 328.1

(56) References Cited

U.S. PATENT DOCUMENTS

| | | | | |
|---|---|---|---|---|
| 841,550 A | * | 1/1907 | Leonard | 248/216.1 |
| 2,213,708 A | * | 9/1940 | Lange | 359/514 |
| 2,275,007 A | * | 3/1942 | Caestecker | 248/205.1 |
| 2,901,200 A | * | 8/1959 | Voeks | 248/74.5 |
| 2,960,309 A | * | 11/1960 | Swanson | 254/133 R |
| 3,318,629 A | | 5/1967 | Brandt | |
| 3,834,789 A | * | 9/1974 | Brudy | 359/531 |
| 4,521,468 A | | 6/1985 | Brandt | |
| 4,564,173 A | * | 1/1986 | Atherton et al. | 254/133 R |
| 5,406,780 A | | 4/1995 | Laserson et al. | |
| 5,467,588 A | | 11/1995 | Compton | |
| 5,595,054 A | | 1/1997 | Reynolds de Sousa | |
| 5,653,097 A | | 8/1997 | Hill | |
| 5,765,349 A | | 6/1998 | Michelson | |

OTHER PUBLICATIONS

R.B. Fridley, P.A. Adrian, Mechanical Harvesting Equipment for Deciduous Fruit Trees, California Agricultural Experiment Station, Bulletin 825, Published Jul. 1996 (believed to be out of print–best copy available submitted)pp. 33–36.

* cited by examiner

*Primary Examiner*—Thomas B. Will
*Assistant Examiner*—Meredith C. Petravick
(74) *Attorney, Agent, or Firm*—James M. Duncan

(57) ABSTRACT

A method for connecting a fruit or nut tree to a mechanical shaker so that the shaking force is applied to the heartwood of the tree rather than to the bark and living cambium tissue of the tree, thus preventing or limiting injury to the tree.

2 Claims, 4 Drawing Sheets

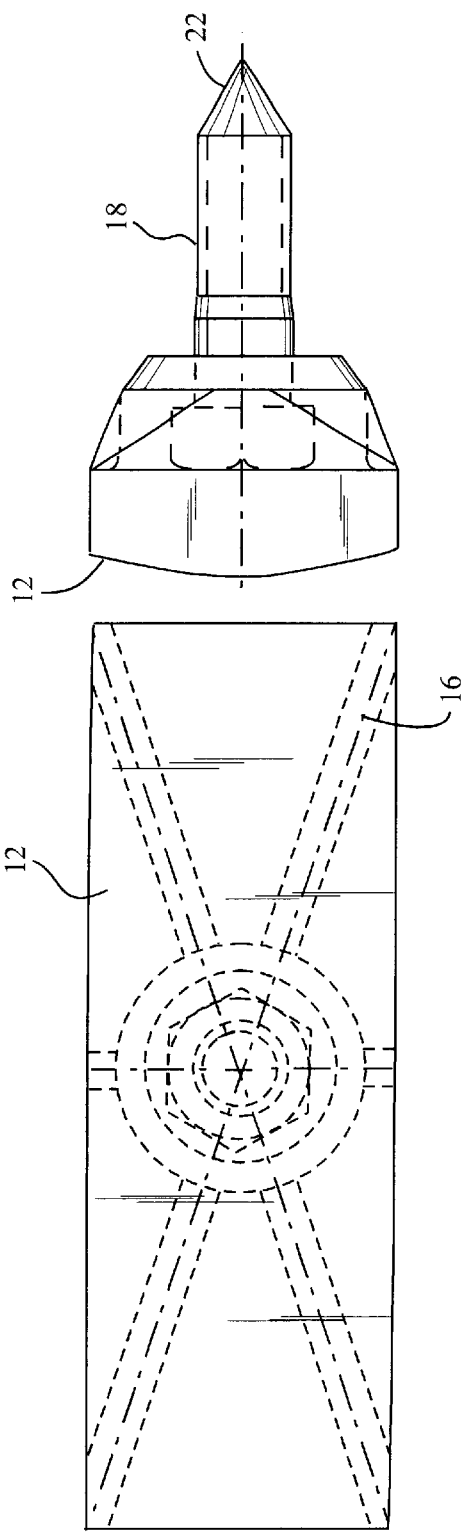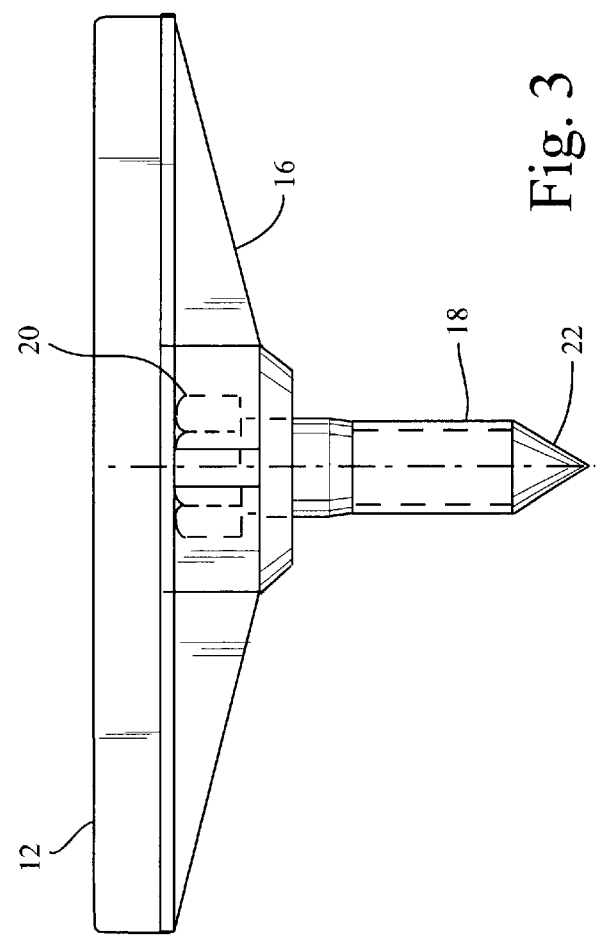
Fig. 2
Fig. 3
Fig. 4

TREE SHAKING METHOD

BACKGROUND OF THE INVENTION

The present invention is directed to devices that are used to harvest fruit and nuts from trees, and, more particularly to a method and apparatus, when combined with a mechanical tree shaker, to harvest fruit and nuts from trees without damaging the bark of the tree and causing injury to the tree.

Mechanical tree shakers are well known for harvesting fruit and nuts from trees. Typically, mechanical tree shakers employ a clamping mechanism which grasps the tree trunk or branches with padded jaws and vigorously shakes the tree to dislodge the fruit or nuts, allowing these food products to be easily picked up off of the ground or from a collection device. A disadvantage of harvesting trees with mechanical tree shakers is that the clamping mechanisms have been known to damage trees by abrading, stripping, gouging or peeling away the tree bark and causing injury and death to the cambium layer of cells beneath the bark during the tree shaking process. The thin cambium is a living tissue that is responsible for producing bark and wood. The cambium layer is often injured and reinjured by the powerful mechanical shakers used to harvest tree crops. Damage to the bark and death of the cambium layer can reduce the productive life of a fruit or nut tree because rot-causing microorganisms infect the debarked wounds of the tree.

Previous devices have been suggested to protect trees from the injuries caused by mechanical shakers. These devices address the problem by padding the contact surface between the clamping mechanism and the tree bark. The simplest device is a solid rubber pad. However, because the surface of the tree engaged by the shaker clamp is not a uniform surface, the rubber pads will not make complete contact with the circumference of the tree, resulting in slippage or concentrated loading, both of which will injure the tree. Therefore, many devices use a deformable pad between the clamping mechanism and the tree bark to increase the surface area of the pad in contact with the tree.

As the clamping mechanism is tightened around the tree, these pads are deformed to provide uniform contact against the surface of the tree. However, various problems are associated with the deformable pads. If the filler material is too stiff, the pad surface will behave as a solid rubber pad and will not adequately conform to the surface of the tree, resulting in slippage, abrasion and injury to the tree. If the deformable pad is loosely packed with fill material, the fill material absorbs the vibratory force of the shaker before it reaches the tree, thereby reducing the efficiency of the shaker. The composition of the fill material is also important. It is known that during the shaking operation, the fill material can become extremely hot, such that the fill material melts, breaks down or results in gas buildup inside the pad.

A number of attempts have been made to resolve the difficulties associated with deformable pads. U.S. Pat. No. 3,318,629 discloses deformable engagement pads which are filled with a loose packing of granular material, such as sand, metal particles or plastic bits, which can conform to the shape of the tree trunk or limbs. U.S. Pat. No. 4,521,468, recognizing that previously proposed filler materials become overheated during the shaking process, proposes filling the contact pads with small rods of a high impact strength polymer impregnated with a dry, high-melting temperature lubricant. U.S. Pat. No. 5,406,780 discloses a compliant engagement member which resists deformation along the axis of vibration, but which allows off-axis deformation to prevent slippage against the tree. However, all of these inventions attempt to solve the problems associated with deformable pads by modifying the pad, rather than applying the shaking force to a less sensitive part of the tree.

SUMMARY OF THE INVENTION

The present invention is directed to an apparatus and method for mechanically shaking a tree without causing injury to the bark or the cambium layer. While this invention protects undamaged trees from initial injury, it also protects pre-existing wounds from reinjury, thereby allowing damaged trees to heal. While some other pad devices attempt to prevent injury by modifications to the pad, those devices nevertheless transfer the load from the mechanical shaker to the outside surface of the tree trunk through the intervening pad. However, the present trunk-pad transfers the shaking force directly from the mechanical shaker through the trunk-pad to the heartwood of the tree thereby circumventing the bark and cambium tissues.

The trunk-pad comprises an engagement member for connection to the clamping mechanism of a mechanical tree shaker and a longitudinal fastener which transfers the load imparted by the mechanical shaker at the engagement member to the inside of the tree. The engagement member, comprising an outside surface and an inside surface, is constructed so that it might be grasped within the clamping mechanism of the tree shaker. Protruding from the inside surface of the engagement member is a longitudinal fastener having a near end, attached to the engagement member, and a distal end which is adapted to penetrate into the heartwood of the tree trunk. When the disclosed invention is used for shaking a tree, two or more of the trunk-pads are installed on opposite sides of the trunk or limb of a tree, so that each engagement member is the point of contact between the clamping mechanism of the mechanical tree shaker and the tree. Once installed, the disclosed trunk-pad may be used repeatedly, but may also be removed as a tree grows.

In other embodiments of the present invention, a multiplicity of longitudinal fasteners are used on each trunk-pad, which may be used to attach the trunk-pad to trees with larger diameter trunks or where it is desirable to apply a greater shaking force to the trunk-pad. The multiple fasteners increase the load bearing surface of the fasteners thereby allowing greater shaking force to be applied to the tree.

BRIEF DESCRIPTION OF THE DRAWINGS

FIG. 2 is a top plan view of the single fastener embodiment of the invention;

FIG. 3 is a front elevational view of the single fastener embodiment of the invention;

FIG. 4 is a side elevational view of the single fastener embodiment of the invention;

DETAILED DESCRIPTION OF THE EMBODIMENTS

Figure 1:
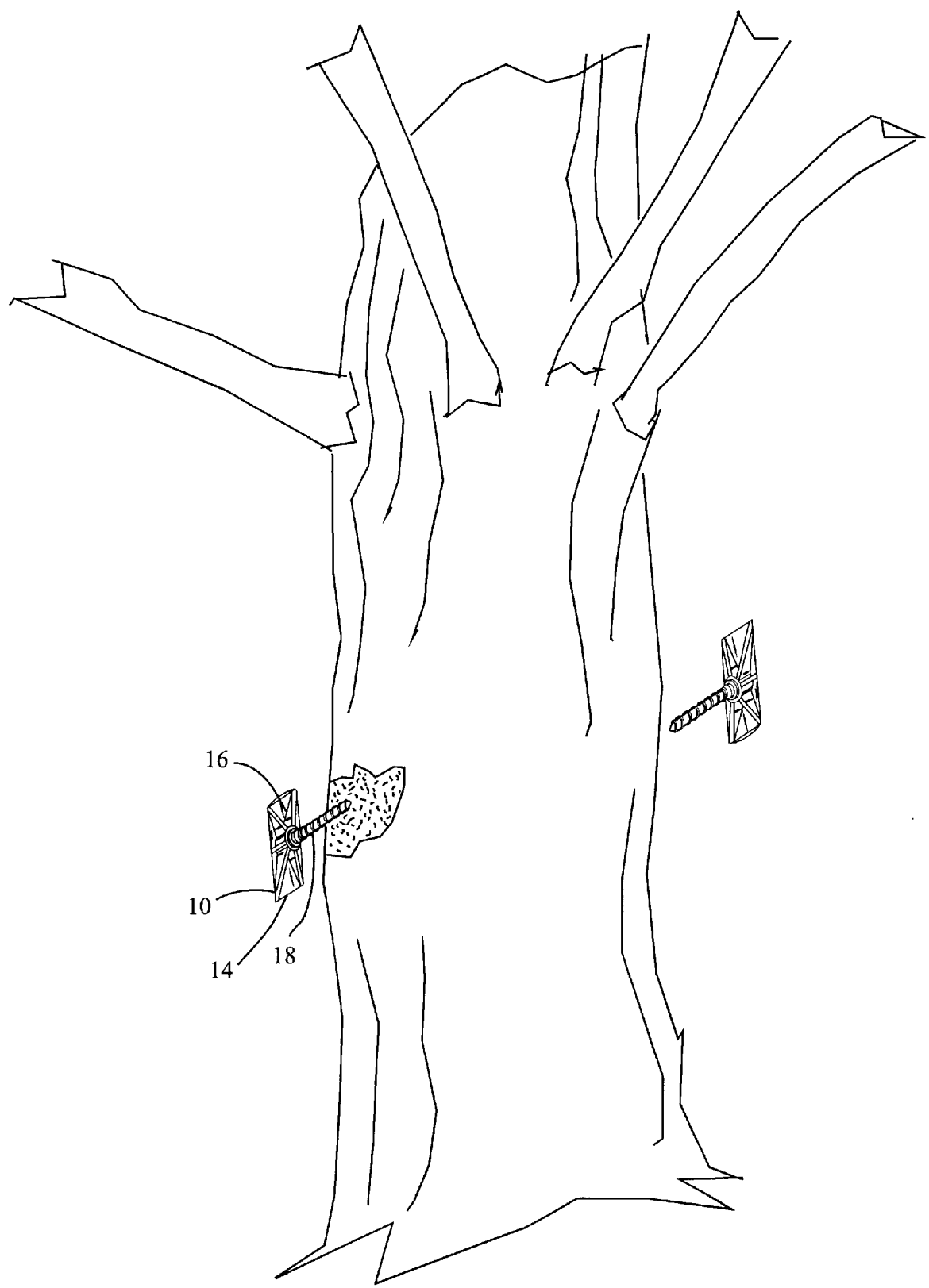
FIG. 1 shows placement of the invention to a tree.

FIG. 1 shows a tree trunk having the disclosed trunk-pad attached on opposite sides of a tree trunk. The engagement member 10 is sized and shaped to be grasped within the jaws of a mechanical tree shaker. As shown in FIG. 2, the engagement member has an outside surface 12 and an inside surface 14. The engagement member 10 is generally rectangular in shape, with a generally flat or curved outside surface 12. As shown in FIGS. 2 and 3, the inside surface 14 may include reinforcement members 16 to provide stability and support to the longitudinal fastener 18. A variety of durable materials may be used to construct the engagement member 10, such as a material suitable for rigid one-piece or unitary molded construction, such as conventional glass-filled polypropylene plastic. A usable such plastic is 30% glass-filled polypropylene which has been found to provide the required strength. A ultra-violet inhibitor may be added to this material to prevent degradation of the material. The engagement member 10 may also be constructed or coated with a reflective or luminous material, so that the trunk-pad either reflects light or glows in the dark, thereby preventing collisions with the tree in the dark.

Conventional fasteners, such as lag screws, screw nails, bolts or solid plastic nipples may be used for the longitudinal fastener 18. The engagement member 10 is molded around the fastener head 20 to secure the engagement member to the longitudinal fastener 18. The distal end 22 of the longitudinal fastener 18 may be pointed to assist in driving the longitudinal fastener into the heartwood of the tree. The longitudinal fastener 18 may include threads, ribbing, ridges, or a rough surface texture to prevent its movement in the heartwood or withdrawal of the fastener from the tree during shaking operations. Installation of the trunk-pad is accomplished by predrilling a pilot hole into the desired location on the tree, and then either screwing the longitudinal fastener 18 into the predrilled hole, or hammering the engagement member to drive the fastener into the hole until the trunk-pad is securely anchored to the tree.

Figure 5:
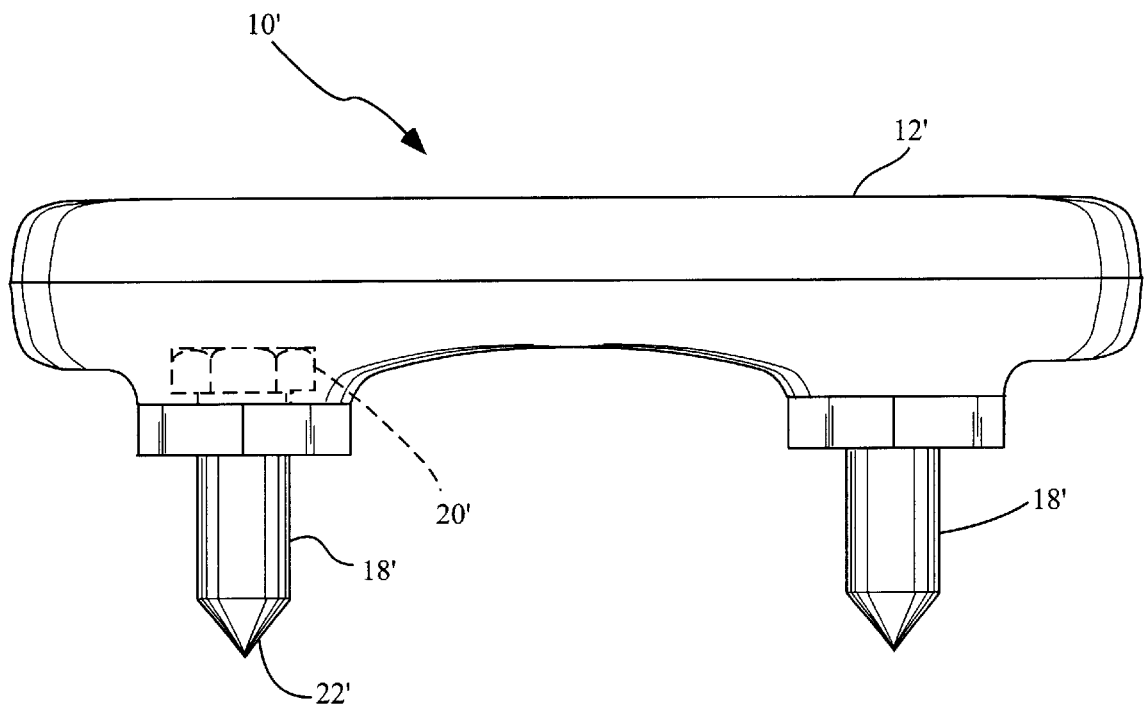
FIG. 5 is front elevational view of the dual fastener embodiment of the invention.
Figure 6:
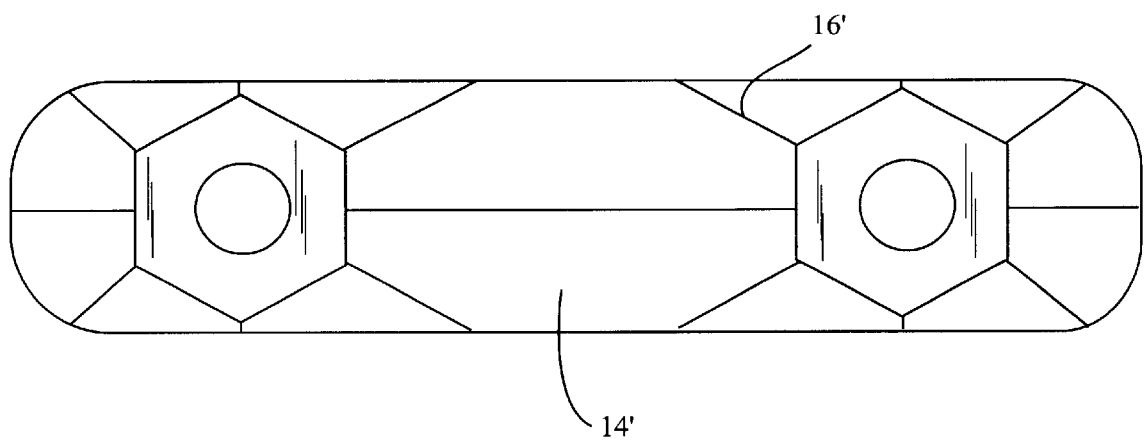
FIG. 6 is a bottom plan view of the dual fastener embodiment of the invention.

The dual fastener embodiment is shown in FIG. 5 and FIG. 6. This embodiment includes two longitudinal fasteners 18', which may be lag screws, screw nails, bolts, steel rods or solid plastic nipples. Unlike the single fastener embodiment, which may be screwed into the tree using the engagement member 10 as a handle to rotate the bunk-pad, the dual fastener embodiment shown in FIG. 5 and FIG. 6 cannot not be installed by rotating the engagement member 10'. Instead, the longitudinal fasteners 18' are usually driven into the tree by hammering the engagement member 10'. The distal end 22' of the longitudinal fastener 18' may be pointed to assist in driving the longitudinal fastener into the heartwood of the tree. Similar to the single fastener embodiment, the engagement member 10' is molded around the fastener head 20' to secure the engagement member to the longitudinal fastener 18'.

Figure 7:
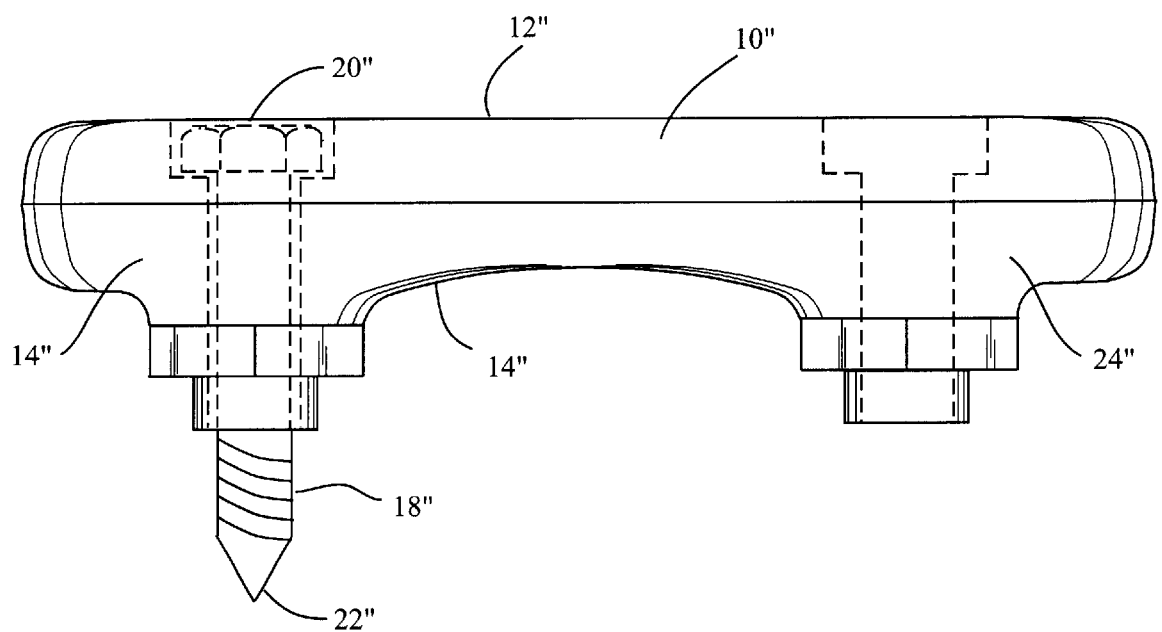
FIG. 7 is a front elevational view of an alternative embodiment of the dual fastener embodiment of the invention.

An alternative embodiment of the dual fastener trunk-pad is shown on FIG. 7. An engagement member 10" may be constructed so that holes 24" penetrate from the outside surface 12" to the inside surface 14", so as to allow longitudinal fasteners 18" such as lag screws, bolts, nails or rods to be installed through the holes. This embodiment allows the longitudinal fasteners 18" to be installed by rotating means, such as a wrench, socket, or screwdriver. In this embodiment, counter-sinking of the hole 24" is required at the outside surface 12" to allow the fastener head 20" to be installed so that it does not extend outside of the outside surface.

The method disclosed herein comprises connecting trunk-pads to the trunk or a limb on a nut tree with longitudinal fasteners and thereafter connecting the clamping mechanism of a mechanical tree shaker to the tree, such that the only points of contact between the clamping mechanism and the tree are the engagement members of the trunk-pads. The mechanical tree shaker is then engaged to vigorously shake the tree, thereby dislodging fruit or nuts from the tree, with minimal injury or damage to the bark or cambium of the tree.

While the above is a description of various embodiments of the present invention, further modifications may be employed without departing from the spirit and scope of the present invention. For example, the size, shape, and/or material of the various components may be changed as desired, such as modifying the shape, size or material of the engagement head 10. Thus the scope of the invention should not be limited by the specific structures disclosed. Instead the true scope of the invention should be determined by the following claims.

What is claimed is:

1. A method for shaking a tree, comprising the steps of:
    (a) inserting a longitudinal fastener of a first trunk-pad into one side of the trunk of a tree, so that an engagement member of the trunk-pad abuts the outside surface of the tree trunk;
    (b) inserting a longitudinal fastener of a second trunk-pad into the opposite side of the trunk of a tree from the first trunk-pad so that an engagement member of the second trunk-pad abuts the outside surface of the trunk;
    (c) attaching a clamping mechanism of a tree shaking machine to the engagement members of the first and second trunk-pads such that the only points of contact between the clamping mechanism and the tree are the trunk-pads; and
    (d) shaking the tree with the tree shaking machine.

2. A method for shaking a tree, comprising the steps of:
    (a) inserting a longitudinal fastener of a first trunk-pad into one side of the limb of a tree so that an engagement member of the trunk-pad abuts the outside surface of the tree limb;
    (b) inserting a longitudinal fastener of a second trunk-pad into the opposite side of the limb of a tree from the first trunk-pad so that an engagement member of the second trunk pad abuts the outside surface of the limb;
    (c) attaching a clamping mechanism of a tree shaking machine to the engagement members of the first and second trunk-pads such that the only points of contact between the clamping mechanism and the tree limb are the trunk-pads; and
    (d) shaking the tree limb with the tree shaking machine.

\* \* \* \* \*